(12) United States Patent
Madsen et al.

(10) Patent No.: US 11,560,878 B2
(45) Date of Patent: Jan. 24, 2023

(54) DAMPER UNIT FOR A TOWER STRUCTURE

(71) Applicant: Vestas Wind Systems A/S, Aarhus N. (DK)

(72) Inventors: Søren Bøgelund Madsen, Aarhus N (DK); Jes Grøn Andersen, Skødstrup (DK)

(73) Assignee: Vestas Wind Systems A/S, Aarhus N (DK)

( * ) Notice: Subject to any disclaimer, the term of this patent is extended or adjusted under 35 U.S.C. 154(b) by 147 days.

(21) Appl. No.: 17/254,338

(22) PCT Filed: Jun. 26, 2019

(86) PCT No.: PCT/DK2019/050206
§ 371 (c)(1),
(2) Date: Dec. 21, 2020

(87) PCT Pub. No.: WO2020/001719
PCT Pub. Date: Jan. 2, 2020

(65) Prior Publication Data
US 2021/0254605 A1    Aug. 19, 2021

(30) Foreign Application Priority Data
Jun. 29, 2018  (DK) .......................... PA 2018 70450

(51) Int. Cl.
*F03D 80/80* (2016.01)
*F03D 13/20* (2016.01)
*F03D 17/00* (2016.01)

(52) U.S. Cl.
CPC ............. *F03D 80/88* (2016.05); *F03D 13/20* (2016.05); *F03D 17/00* (2016.05);
(Continued)

(58) Field of Classification Search
CPC .... F03D 17/00; F03D 80/88; F05B 2240/912; F05B 2260/964; F05B 2270/821; E04H 9/0215; F16F 7/1005
See application file for complete search history.

(56) References Cited

U.S. PATENT DOCUMENTS 11,346,324 B2 * 5/2022 Johansen ................ F03D 13/10
2004/0195356 A1   10/2004 Ellsworth
(Continued)

FOREIGN PATENT DOCUMENTS

EP   2295795 A1   3/2011
EP   2696072 A1   2/2014
(Continued)

OTHER PUBLICATIONS

Intellectual Property India, Examination Report in IN Application No. 202117001885, dated Jul. 18, 2022.
(Continued)

*Primary Examiner* — Pedro J Cuevas
(74) *Attorney, Agent, or Firm* — Wood Herron & Evans LLP

(57) ABSTRACT

The present invention relates to a damper unit for damping oscillations of a tower structure when secured thereto, the damper unit comprising a damper unit structure adapted for attachment to the tower structure, a pendulum structure, a suspension arrangement for suspending the pendulum structure from the damper unit structure such that the pendulum structure is allowed to displace from a neutral position for the pendulum structure, the suspension arrangement comprising one or more wires for suspending the pendulum structure, a sensor adapted for measuring oscillations of the tower structure, and tuning means configured for adjusting the natural frequency of the suspended pendulum structure in response to measured oscillations of the tower structure.

(Continued)

The present invention further relates to an associated method.

17 Claims, 8 Drawing Sheets

(52) U.S. Cl.
CPC ... *F05B 2240/912* (2013.01); *F05B 2260/964* (2013.01); *F05B 2270/342* (2020.08); *F05B 2270/821* (2013.01)

(56) References Cited

U.S. PATENT DOCUMENTS

| | | | |
|---|---|---|---|
| 2006/0147306 A1* | 7/2006 | Zheng | F03D 80/80 416/1 |
| 2010/0314883 A1* | 12/2010 | Ollgaard | F03D 80/00 290/55 |
| 2016/0252079 A1* | 9/2016 | Ollgaard | F03D 7/0296 52/745.17 |
| 2017/0328058 A1 | 11/2017 | Dorsam et al. | |
| 2018/0017125 A1* | 1/2018 | Amdisen | F03D 13/20 |
| 2019/0048855 A1* | 2/2019 | Rodriguez Tsouroukdissian | F16F 15/02 |
| 2020/0332548 A1* | 10/2020 | Mortensen | F16F 7/116 |
| 2020/0378466 A1* | 12/2020 | Madsen | F16F 15/022 |
| 2021/0246879 A1* | 8/2021 | Mortensen | E04H 9/0215 |
| 2021/0246880 A1* | 8/2021 | Johansen | F03D 7/0296 |
| 2021/0254605 A1* | 8/2021 | Madsen | F16F 7/1005 |
| 2022/0049682 A1* | 2/2022 | Madsen | F03D 80/88 |
| 2022/0252047 A1* | 8/2022 | Johansen | F03D 13/10 |
| 2022/0275789 A1* | 9/2022 | Trung | F03D 80/80 |

FOREIGN PATENT DOCUMENTS

| | | | | |
|---|---|---|---|---|
| EP | 3269997 A1 | | 1/2018 | |
| EP | 3441609 A1 * | | 2/2019 | E04B 1/985 |
| EP | 4050210 A1 * | | 8/2022 | F03D 13/10 |
| KR | 20110077629 A | | 7/2011 | |
| KR | 20140055667 A | | 5/2014 | |
| WO | 9202743 A1 | | 2/1992 | |
| WO | 2009068599 A2 | | 6/2009 | |
| WO | 2015062608 A1 | | 5/2015 | |
| WO | 2018059638 A1 | | 4/2018 | |
| WO | WO-2020001720 A1 * | | 1/2020 | F03D 13/10 |
| WO | WO-2020002393 A1 * | | 1/2020 | F03D 13/20 |

OTHER PUBLICATIONS

European Patent Office, Intention to Grant in EP Application No. 19736299.9, dated Jun. 10, 2022.

Danish Patent and Trademark Office, Search and Examination Report in PA 2018 70450, dated Dec. 21, 2018.

European Patent Office, International Search Report and Written Opinion in PCT Application No. PCT/DK2019/050206, dated Aug. 27, 2019.

* cited by examiner

DAMPER UNIT FOR A TOWER STRUCTURE

FIELD OF THE INVENTION

The present invention relates to a simple and robust damper for in particular wind turbine towers, more particularly an automatically tuned mass damper for damping oscillations of a tower structure.

BACKGROUND OF THE INVENTION

Vortex shedding is a phenomenon that occurs due to instability of the flow around an object, such as a wind turbine tower. Low-pressure vortices are created on the downstream side of the tower and intermittently detach from either side of the tower. The tower will tend to move towards the low pressure, i.e. an alternating force is applied to the tower. The frequency by which the force alternates from side to side depends on the diameter of the tower and the wind speed. At a certain wind speed the frequency of the alternating force coincides with the natural frequency of the wind turbine tower, i.e. the tower frequency of the wind turbine tower. This wind speed is known as the critical wind speed. At this wind speed the tower will start to oscillate.

The amplitudes of the oscillations at the critical wind speeds depend on the structural damping of the wind turbine tower. If no additional damping is added to the wind turbine tower the oscillations can result in severe deflections of the wind turbine tower.

The effects of vortex shedding are especially pronounced during construction of the tower until the nacelle has been installed.

It may be seen as an object of embodiments of the present invention to provide a damper unit for damping oscillations of wind turbine towers.

It may be seen as a further object of embodiments of the present invention to provide a simple and robust automatically tuned mass damper unit for damping oscillations of wind turbine towers.

BRIEF DESCRIPTION OF THE INVENTION

The above-mentioned objects are complied with by providing, in a first aspect, a damper unit for damping oscillations of a tower structure when secured thereto, the damper unit comprising
- a damper unit structure adapted for attachment to the tower structure,
- a pendulum structure,
- a suspension arrangement for suspending the pendulum structure from the damper unit structure such that the pendulum structure is allowed to displace from a neutral position for the pendulum structure, the suspension arrangement comprising one or more wires for suspending the pendulum structure,
- a sensor adapted for measuring movements of the tower structure, and
- tuning means configured for adjusting the natural frequency of the suspended pendulum structure in response to measured movements of the tower structure.

Thus, according to the first aspect of the present invention a damper unit for damping oscillations of a tower structure when secured thereto is provided. As it will be discussed in further details below the damper unit may be an automatically tuned mass damper configured to adjust the natural frequency of the suspended pendulum structure in response to measured movements of the tower structure to which the damper unit is secured.

In the context of the present application the term "wire" is used to describe an elongate member where the free length can be adjusted. Thus a rod, where the position of the suspension point or pivot point and thus the free length can be adjusted would fall under that term.

An automatically tuned mass damper is advantageous for damping oscillations in a tower structure in that the exact natural frequency of a tower structure is typically not known—typically only a narrow frequency range around/including the natural frequency is known. Thus, by selecting an automatically tuned mass damper comprising a suspended pendulum structure having an adjustable natural frequency that may be optimized with respect to the natural frequency of the tower structure. The exact natural frequency of the tower structure may be measured from horizontal accelerations and/or movements of the tower structure over time. The optimal natural frequency of the suspended pendulum structure may be a few percentages lower than the natural frequency of the tower structure.

In terms of positioning of the damper unit in relation to the tower structure the damper unit may be located inside or most preferably outside of the tower structure. The damper unit may be attached to the tower structure through any suitable attachment means that can provide the structural integrity for supporting the damper unit. Moreover, when located outside the tower structure, the damper unit may be attached directly to the tower wall with a releasable attachment means, such that the damper unit can be released and removed from the tower upon completion of tower construction. Also, the damper unit may be secured to the tower structure while it is still on the ground, i.e. prior to upending the tower structures.

The term tower structure is to be understood broadly in that it may cover a complete tower, such as a complete wind turbine tower, or a tower section adapted to be secured to other tower sections. It should also be noted that a plurality of damper units may be secured to the same tower structure. The damper unit may further comprise a winch or hoist system (or at least part thereof) in order to ease lowering of the damper unit from a completed wind turbine tower.

As discussed in further details below it may be advantageous to suspend the pendulum structure in three wires in that such a suspension arrangement is more robust and less sensitive to local vibration modes.

The sensor adapted for measuring movements of the tower structure may in principle be any kind of vibration or acceleration sensor being capable of measuring movement in real time. The measured data will be converted in the tuning means for use during adjustment of the natural frequency of the pendulum structure. The sensor can be located inside the damper unit, as the damper unit will move with the tower structure because it is attached thereto and thus the sensor will also measure movements of the tower.

The tuning means may comprise processor means for adjusting, in real time, the natural frequency of the suspended pendulum structure in response to measured movements of the tower structure, i.e. in response to a real time signal originating from the sensor. As it will be disclosed in further details below the natural frequency of the suspended pendulum may be adjusted by adjusting the length of the free wire sections of the wires suspending the pendulum structure.

The tuning means may be adapted to optimize the natural frequency of the suspended pendulum structure with respect to the natural frequency of the tower structure which may be below 1 Hz. The optimal natural frequency of the suspended pendulum structure may be a few percentages lower than the natural frequency of the tower structure.

In one embodiment, the damper unit comprises a displacement sensor adapted for measuring displacement of the pendulum structure. The processor means is adapted for optimizing, in real time, the damping effect of the pendulum structure based on the measured displacement.

The damping effect of the pendulum structure can be optimized by properly selecting the natural frequency of the pendulum structure with respect to the natural frequency of the tower structure. As mentioned above, the optimal natural frequency of the suspended pendulum structure may be a few percentages lower than the natural frequency of the tower structure.

The processor includes and optimization algorithm where it adjusts the length of the pendulum and evaluates the effect on such adjustments on the displacement of the pendulum. This is done real time for continuous optimization of the dampening effect.

In an embodiment the processor applies a limit to the displacement of the pendulum structure by applying a limit on the maximum length of the free wire sections of the wires suspending the pendulum structure.

In another embodiment the displacement of the pendulum structure may be maintained below a threshold displacement by deliberately detuning the natural frequency of the pendulum structure with respect to the natural frequency of the tower structure.

In one embodiment the tuning means may comprise a suspension length adjuster for adjusting the natural frequency of the suspended pendulum structure, said adjuster comprising, a guide means extending at least partly along the length of said one or more wires,
a cart attached to and movable along the guide means,
for each of said one or more wires, a clamp secured to the cart at one end and to the wire at the other end, and
actuation means for moving the cart along the guide means, the actuation means being operably connected to the processor.

The guide means may be implemented as a guide rail. The cart may be implemented as a movable sledge to which a clamp is secured for each wire. The guide rail may have a total length allowing displacement of the clamp up to 2.5-3.5 metres, such as up to around 2.7 metres. The actuation means for moving the cart along the guide means may involve an electrically driven actuator, such as motor, or a pneumatic driven actuator.

In another embodiment the tuning means may comprise a suspension length adjuster for adjusting the natural frequency of the suspended pendulum structure, said adjuster comprising, a guide means extending at least partly along the length of said one or more wires,
a cart attached to and movable along the guide means, wherein the cart comprises a locking means for fixing the position of the cart in relation to the guide means, wherein the cart further comprises a fine adjustments guide means extending at least partly along the length of said one or more wires and a fine adjustments cart attached to and movable along the fine adjustments guide means,
for each of said one or more wires, a clamp secured to the fine adjustments cart at one end and to the wire at the other end,
an actuation means for moving the fine adjustments cart along the fine adjustments guide means, the actuation means being operably connected to the processor.

Again, the guide rail may have a total length allowing displacement of the clamp up to 2.5-3.5 metres, such as up to around 2.7 metres. The cart may again be implemented as a movable sledge to which a clamp is secured for each wire. The locking means may involve one or more steel splits configured to be inserted into holes in the guide means thereby fixing the position of the cart in relation to the guide means.

The fine adjustments guide means extending at least partly along the length of said one or more wires may be also be a guide rail having a total length that allows displacing the clamp a distance in the range 30-50 cm, such as approximately 40 cm along the length of the wires. The fine adjustments cart attached to and movable along the fine adjustments guide means may be implemented as a movable sledge to which a clamp is secured for each wire.

The actuation means for moving the fine adjustments cart along the fine adjustments guide means may involve an electrically driven actuator, such as motor, or a pneumatic driven actuator.

The damper unit may further comprise one or more springs, wherein said one or more springs are connected to the damper unit at one end and to the pendulum structure at the other end. The one or more springs may be adapted for activation in case the damper unit is to be configured for damping natural frequencies that are out of the range for the suspension arrangement, such as below the range of the suspension arrangement.

The one or more springs may also be used for adjusting the natural frequency of the suspended pendulum structure in an embodiment where the pendulum structure is suspended in one or more rods each having a stationary part and a moving part being separated by a flexible joint, such as an universal joint.

The damper unit may further comprise one or more fastening means adapted for securing the damper unit to a convex surface, such as an outer surface of a wind turbine tower.

The damper unit may further comprise a pendulum damper unit for damping oscillations of the pendulum structure. The pendulum damper unit may be selected among friction based dampers, liquid based dampers or Eddy current based dampers. A friction based damper will be disclosed in further details below.

In a second aspect the present invention relates to a tower structure having a damper unit according to the first aspect secured thereto, wherein the tower structure forms part of a wind turbine tower or wind turbine tower section. It should be noted that the wind turbine tower or wind turbine tower section may have a plurality of damper units secured thereto. In fact a damper unit may be secured to every tower section forming a complete wind turbine tower.

In a third aspect the present invention relates to a method for damping oscillations of a tower structure, the method comprising the steps of securing a damper unit to the tower structure, said damper unit comprising
a damper unit structure adapted for attachment to the tower structure,
a pendulum structure, and
a suspension arrangement for suspending the pendulum structure from the damper unit structure such that the pendulum structure is allowed to displace from a neutral position for the pendulum structure, the suspension arrangement comprising one or more wires
for suspending the pendulum structure,
measuring movements of the tower structure, and
adjusting the natural frequency of the suspended pendulum structure in response to measured movements of the tower structure in order to dampen oscillations of a tower structure.

The damper unit applied when performing the method according to the third aspect may be of the type disclosed in relation to the first aspect. Thus, the damper unit may further comprise a sensor adapted for measuring movements of the tower structure, and tuning means configured for adjusting the natural frequency of the suspended pendulum structure in response to measured movements of the tower structure. The sensor and the tuning means may be implemented as discussed in relation to the first aspect.

It is advantageous that the natural frequency of the suspended pendulum structure may be adjusted in response to measured movements of the tower structure in real time. The most effective damping of tower oscillations may be obtained if the natural frequency of the suspended pendulum structure is optimized with respect to the natural frequency of the tower structure. The optimal natural frequency of the suspended pendulum structure may be a few percentage lower than the natural frequency of the tower structure. In other to optimize the natural frequency of the tower structure the natural frequency of the suspended pendulum structure may be below 2 Hz, such as below 1.5 Hz, such as below 1 Hz. The natural frequency of the suspended pendulum structure may however be higher than 0.2 Hz, such as higher the 0.5 Hz.

As previously addressed the natural frequency of the suspended pendulum structure may be adjusted by moving, for each of said one or more wires, a movable clamp along a longitudinal direction of the one or more wires, said movable clamp being secured to the damper unit at one end and to the wire at the other end, and wherein the securing of the clamp is configured such that the clamp is movable along a longitudinal direction of the one or more wires. The movable clamp may be attached to a cart which is attached to and movable along a guide means via for example electric or pneumatic means. A processor may ensure that the adjustment of the natural frequency of the pendulum structure is performed in real time.

BRIEF DESCRIPTION OF THE DRAWINGS

The present invention will now be explained in further details with reference to the accompanying figures, wherein.

Figure 1:
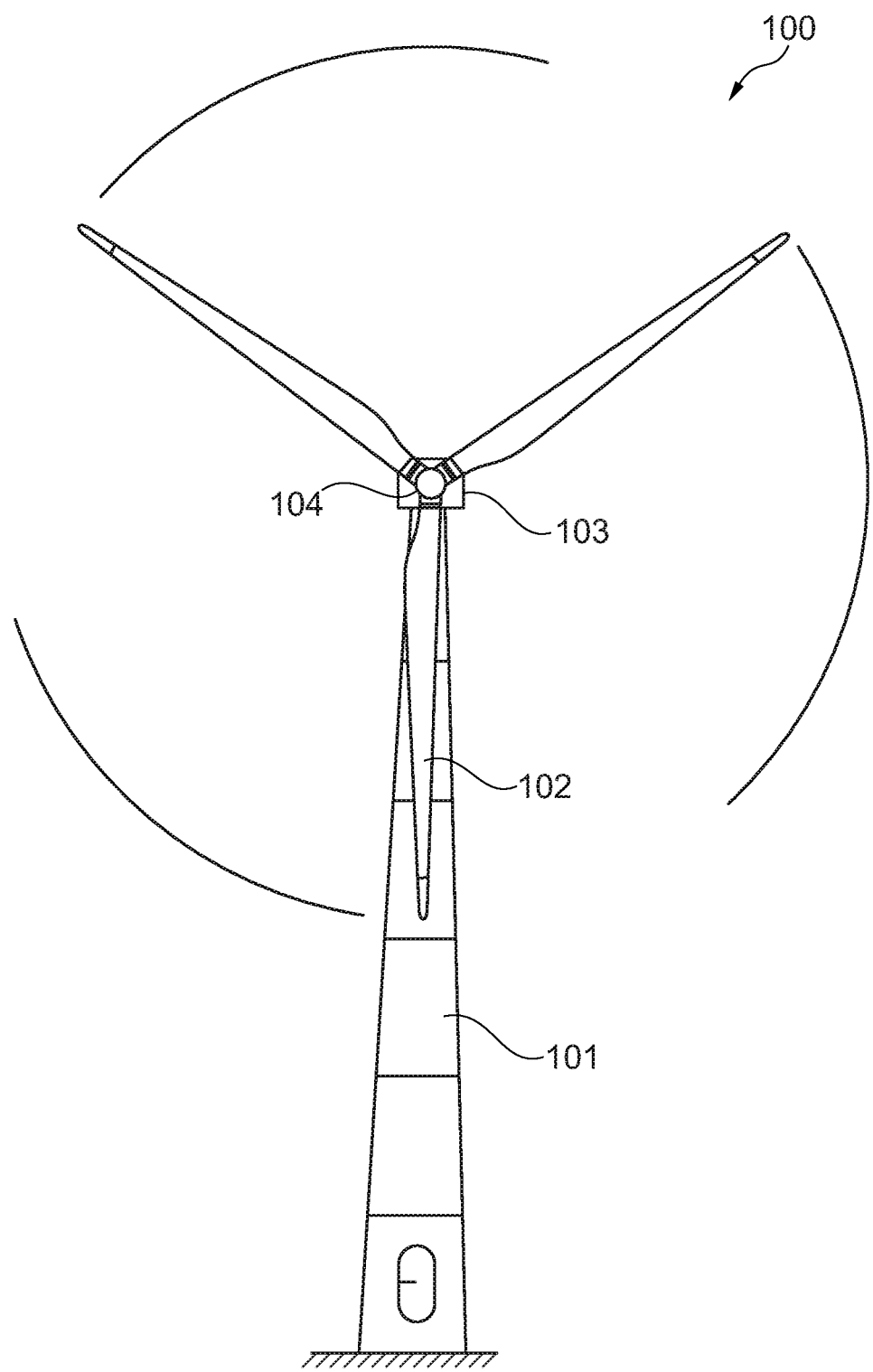
FIG. 1 shows a wind turbine generator.

While the invention is susceptible to various modifications and alternative forms specific embodiments have been shown by way of examples in the drawings and will be described in details herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

In a general aspect the present invention relates to an automatically tuned mass damper for damping oscillations of an associated tower structure, such as a wind turbine tower, to which the automatically tuned mass damper is attached. The automatically tuned mass damper comprises a suspended pendulum structure, a sensor for measuring movements of the tower structure to which the automatically tuned mass damper is attached, and tuning means configured for adjusting the natural frequency of the suspended pendulum structure in response to measured movements of the tower structure. The damping characteristics of the automatically tuned mass damper may thus be adjusted in real time in response to measured movements of the tower structure.

Referring now to FIG. 1 a wind turbine generator 100 is depicted. As seen in FIG. 1 the wind turbine generator 100 comprises a wind turbine tower 101, a nacelle 103 as well as three rotor blades 102 secured to a rotor hub 104. The wind turbine tower 101 comprises a plurality of tower sections arranged on top of each other in order to form the complete wind turbine tower 101. The wind turbine generator converts wind energy into electrical energy via at least a power generator and a power converter system.

When assembling wind turbine generators of the type depicted in FIG. 1 the wind turbine tower 101 is assembled first. Prior to mounting the nacelle 103, the hub 104 and the rotor blades 102 on the wind turbine tower 101, i.e. during construction of the tower, the partly or fully assembled free standing tower structure may be exposed to Vortex shedding which, at the critical wind speed, will cause the free standing partly or fully assembled tower structure 101 to oscillate.

Uncontrolled oscillation of wind turbine towers due to Vortex shedding can be effectively counteracted by the automatically tuned mass damper according to the present invention.

Figure 2:
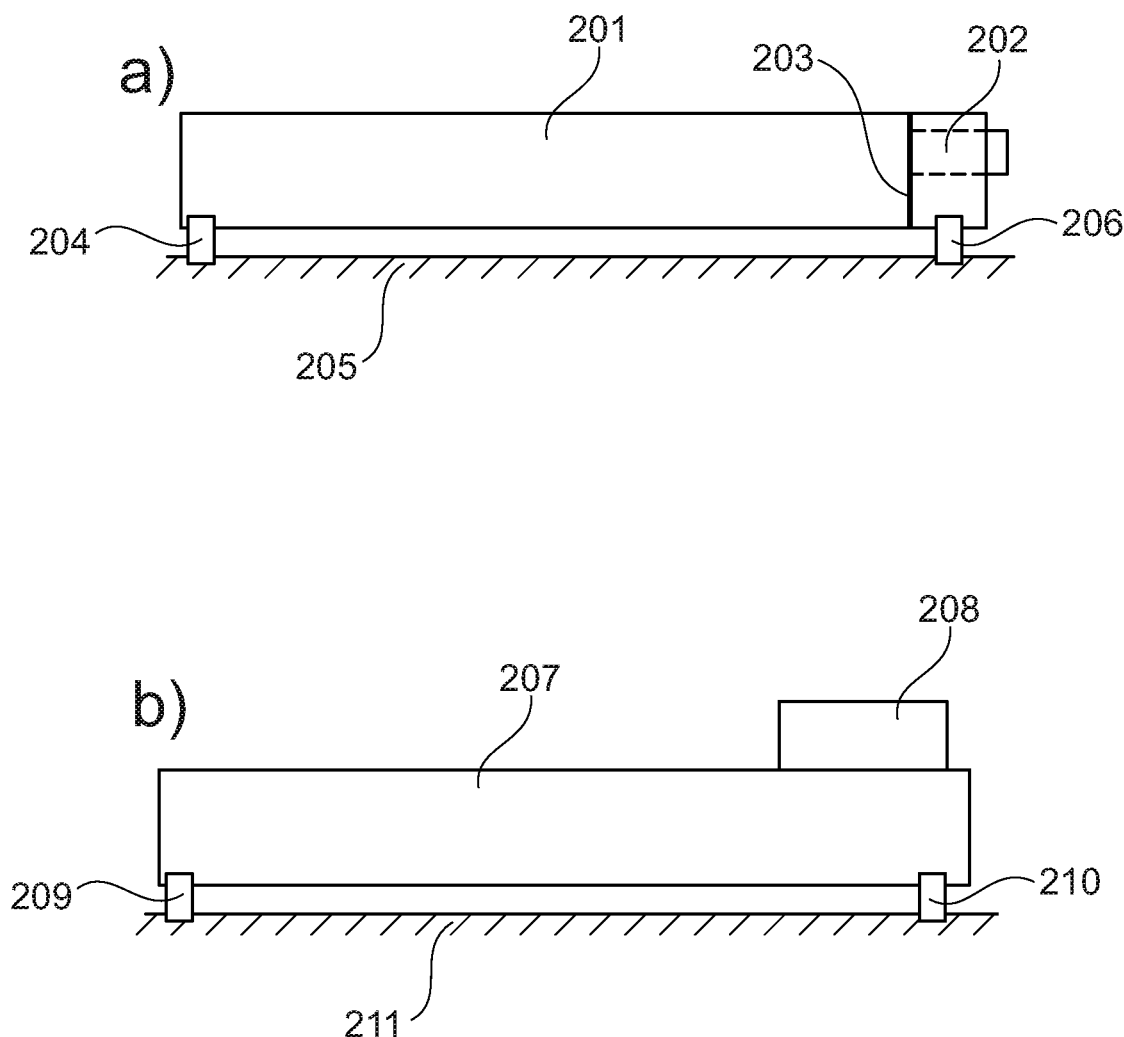
FIG. 2 shows wind turbine tower sections with automatically tuned mass dampers attached thereto.

Referring now to FIGS. 2a and 2b automatically tuned mass dampers 202, 208 may be attached to a tower section 201, 207 while the tower section is still resting on stands 204, 206, 209, 210 on the ground 205, 211—either at the tower factory or at the site prior to upending the tower sections.

As depicted in FIG. 2a the automatically tuned mass damper 202 may be attached to a floor 203 inside the tower section 201. Preferably, the automatically tuned mass damper 208 may be attached to an outside surface of the tower section 207. Attaching automatically tuned mass dampers 202, 208 to tower sections 201, 207 while these are still on the ground may be advantageous in that the automatically tuned mass dampers 202, 208 will be fully operational as soon as the tower sections 201, 207 are upended and the main crane is released after the lifting operation.

Figure 3:
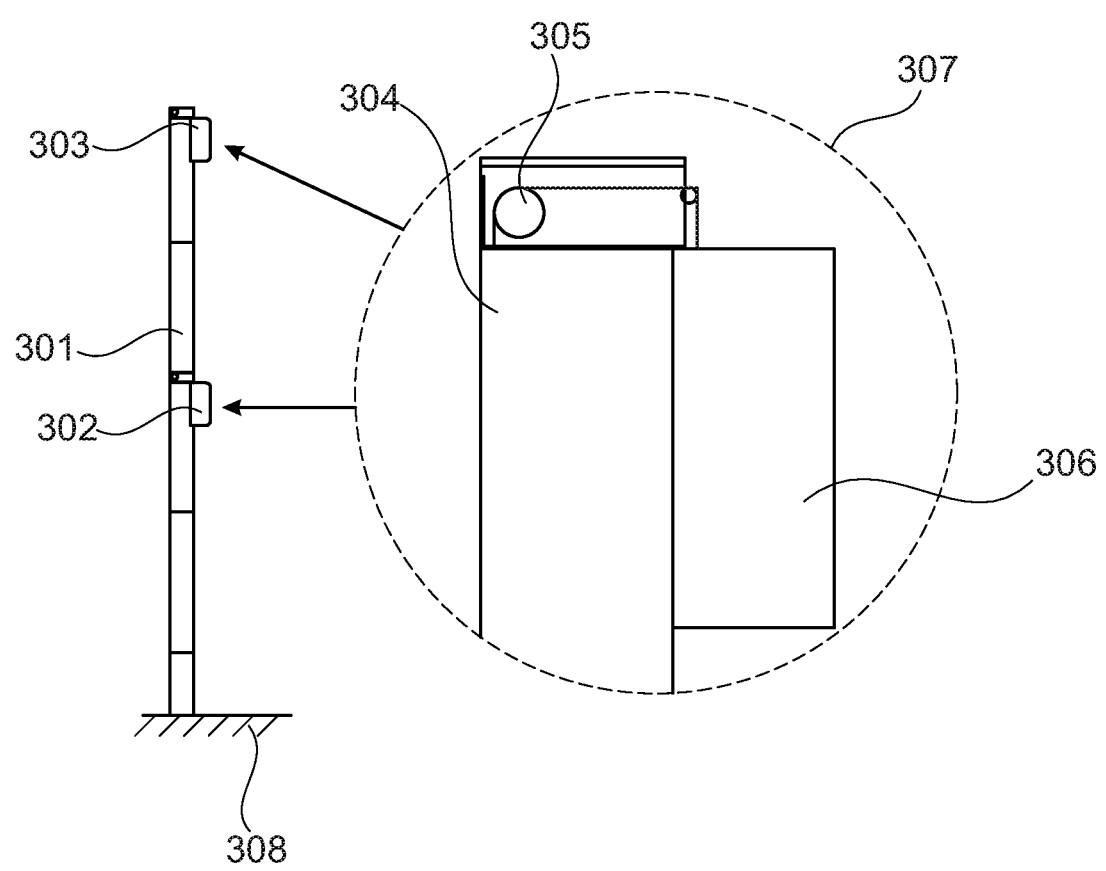
FIG. 3 shows a complete wind turbine tower with two automatically tuned mass dampers attached thereto.
Figure 4:
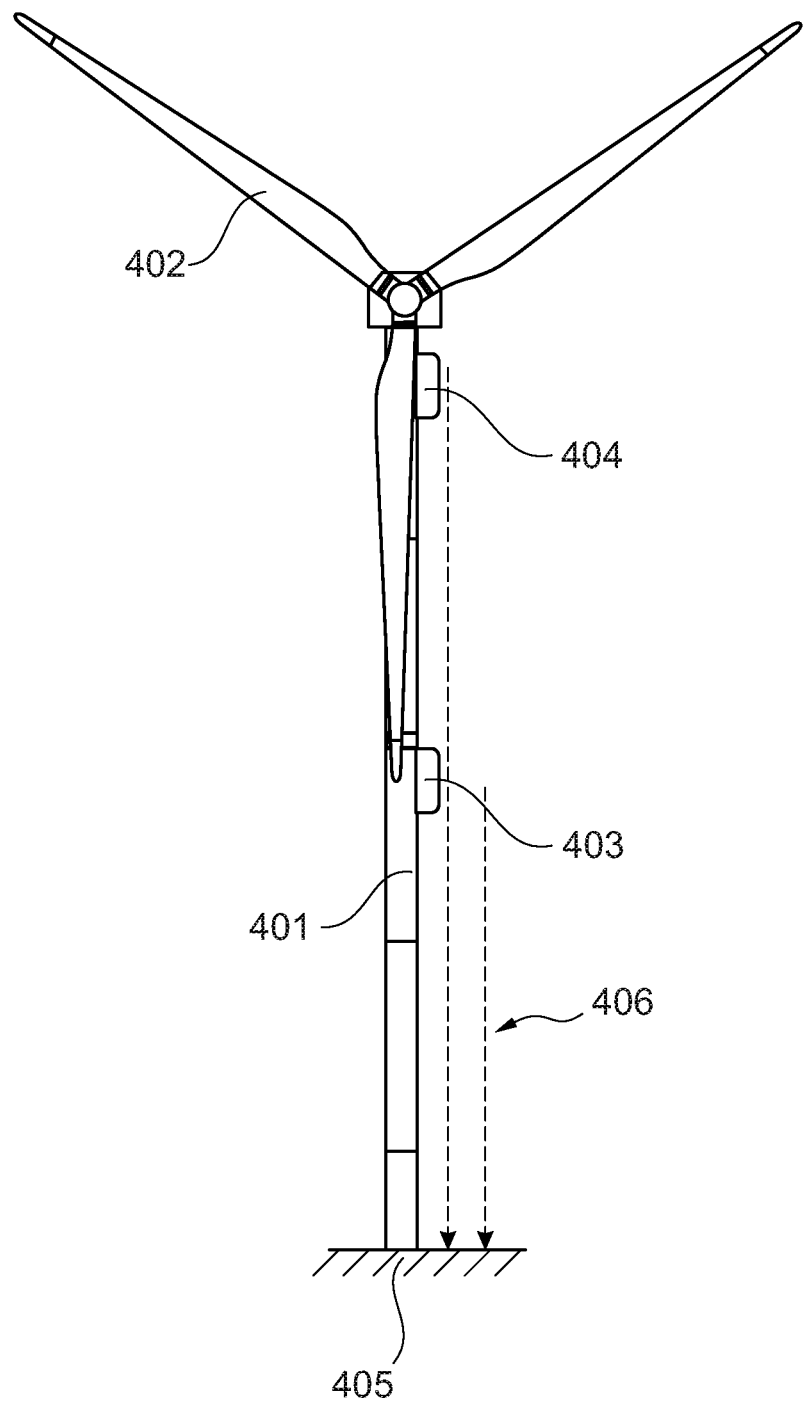
FIG. 4 illustrates lowering of two automatically tuned mass dampers from a complete wind turbine tower.

In FIG. 3 a completely assembled wind turbine tower 301 is depicted. As seen in FIG. 3 two automatically tuned mass dampers 302, 303 are attached to the outside of the wind turbine tower 301. An enlarged view of the automatically tuned mass dampers 302, 303 is shown inside the circle 307 showing a tower section 304 and the automatically tuned mass damper 306 attached thereto. As mentioned above an external crane, such as the main crane, may be used to lower the automatically tuned mass dampers to the ground. Alternatively, a built-in winch or hoist system 305 may be used to lower the automatically tuned mass dampers to the ground. This is illustrated in more details in FIG. 4 where two automatically tuned mass dampers 403, 404 are lowered 406 to the ground 405 using built-in winch or hoist systems after the wind turbine generator, including the tower 401, the rotor blades 402, the nacelle and the hub, is fully assembled.

Turning now to FIG. 5a an automatically tuned mass damper according to the present invention is depicted. As depicted in FIG. 5a a pendulum structure 501 is suspended in a plurality of wires 502, 503 from a fixed damper unit structure 511 which is adapted for attachment to the wind turbine tower. The natural frequency of the suspended pendulum structure 501 may be varied by adjusting the length of the free wire sections 503, and thereby the length LD. The length of the free wire sections 503 may be varied via vertical displacements of the tuning means 505 as indicated by arrow. If the tuning means 505 moves up the free wire sections 503 become longer and the natural frequency of the suspended pendulum structure 501 is lowered. Similarly, if the tuning means 505 moves down the free wire sections 503 become shorter and the natural frequency of the suspended pendulum structure 501 is increased. The tuning means 505 and the displacements thereof will be disclosed in further details in connection with FIGS. 6 and 7.

In order to protect the suspended pendulum structure 501 collision protecting rims 509 are secured to the suspended pendulum structure 501.

Below the suspended pendulum structure 501 a friction based damping arrangement is provided. As depicted a FIG. 5a a stiff and rigid pole 510 is secured to the pendulum structure 501. As the pendulum structure 501 and consequently also the pole 510 are displaced from their neutral positions one or more of a plurality of friction plates 507 will displaced relative to each other and relative to the fixed floor 508 of the damper unit structure 511. As depicted in FIG. 5a the plurality of friction plates 507 have increasing outer diameters as well as increasing openings 504 (for receiver the pole 510) as the distance to the pendulum structure 501 increases. It should be noted that other types of damper solutions, including liquid based dampers or Eddy current based dampers, may be applicable as well.

Referring now to FIG. 5b the suspended pendulum structure 512, 513 is suspended in three wires 514-516 in that this will provide a robust suspension arrangement whereby local vibration modes can be avoided. A further advantage of suspending the pendulum structure in three wires is that the pole 510 will always be oriented vertically during its interaction with the friction plates 507.

Figure 5:
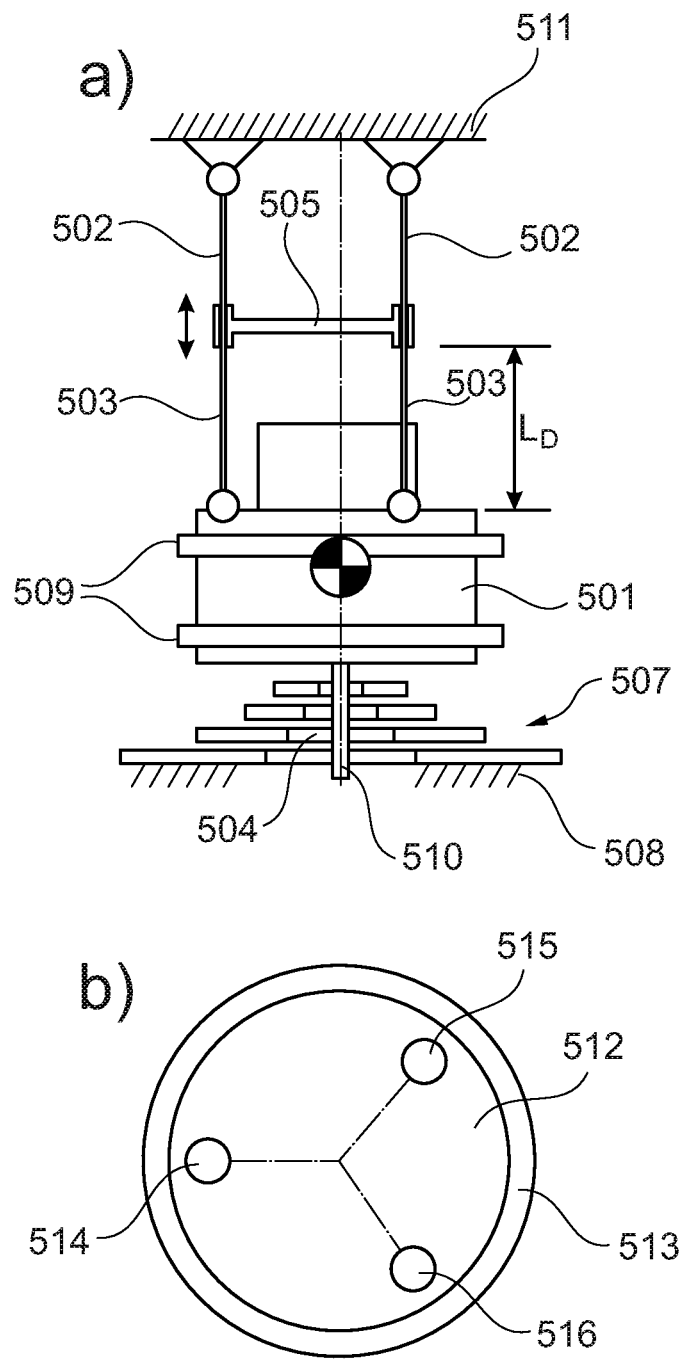
FIG. 5 shows an automatically tuned mass damper according to the present invention.
Figure 6:
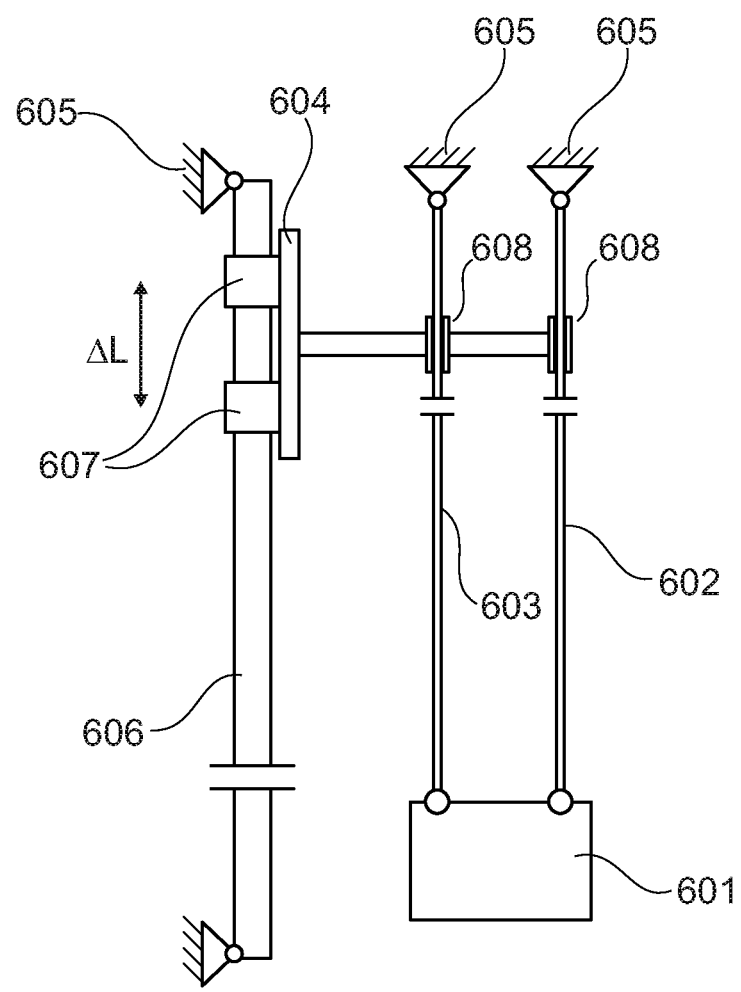
FIG. 6 shows a first arrangement for adjusting the natural frequency of the automatically tuned mass damper.

Referring now to FIG. 6 an embodiment of the tuning means 505 in FIG. 5 is depicted. In the arrangement depicted in FIG. 6, a cart 604 is moveably attached to the guide rail 606 via gliders 607. A clamp 608 for each wire is attached to the cart 604. The clamp 608 fix the wires 602, 603 in the horizontal plane. The total length of the guide rail 606 is such that the clamp 608 may be movable up to 2.5-3.5 metres, such as up to around 2.7 metres. As previously addressed the cart 604 may be positioned relative to the guide rail 606 manually or its position may be controlled automatically using an actuator, such as a motor. As mentioned in relation to FIG. 5a if the cart 604 moves up the free wire sections 602, 603 become longer and the natural frequency of the suspended pendulum structure 601 is lowered. Similarly, if the sledge 604 moves down the free wire sections 602, 603 become shorter and the natural frequency of the suspended pendulum structure 601 is increased. The pendulum structure 601 is suspended from a fixed damper unit structure 605 to which the guide rail 606 is also attached. The embodiment shown in FIG. 6 is advantageous primary due to its simple mechanical construction.

Figure 7:
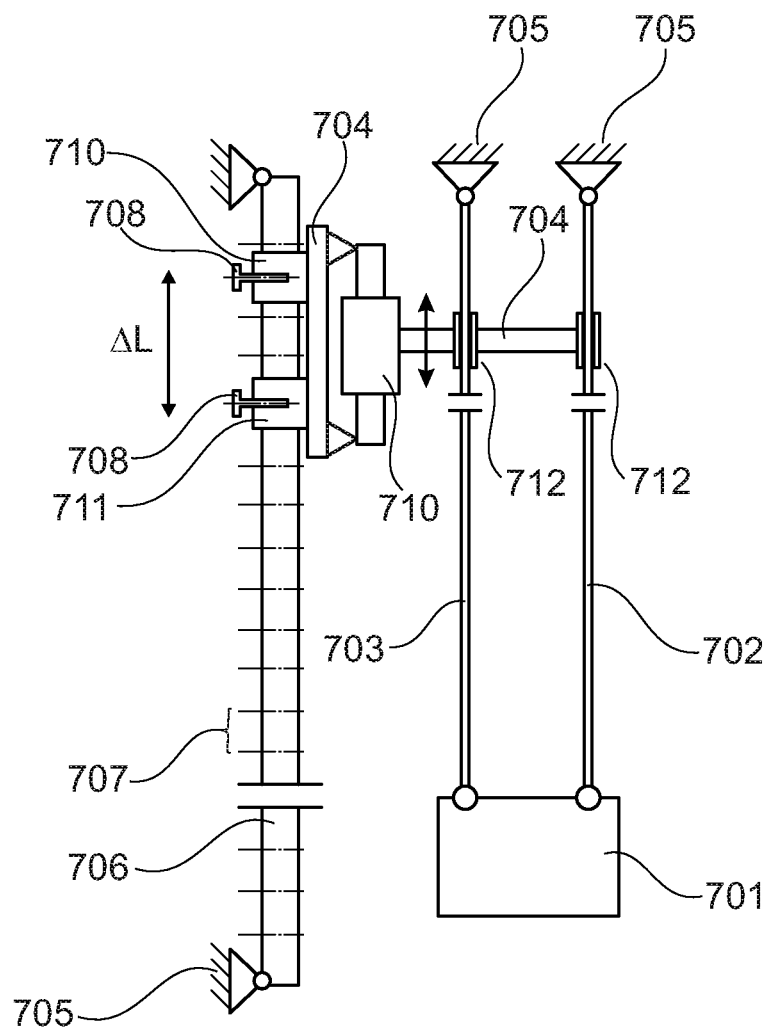
FIG. 7 shows a second arrangement for adjusting the natural frequency of the automatically tuned mass damper.

Referring now to FIG. 7 a cart 704 is moveably attached to the guide rail 706 via a pair of gliders. In contrast to the embodiment depicted in FIG. 6, a pattern of holes having a given distance 707 is provided in the guide rail 706. These holes in the guide rail 706 are adapted to receive a locking means in the form of fasteners 708 for manually fixating the gliders 711, and thereby the cart 704, relative to the guide rail 706. As depicted in FIG. 7 a fine adjustments guide means comprising a second guide rail 709 and a fine adjustments cart 710 is provided for fine adjustments (+/− 200 mm) of the lengths of free wire sections 702, 703 via the arm 704. A clamp 712 for each wire is attached to the cart 704. The clamp 712 fix the wires 702, 703 in the horizontal plane. The total length of the guide rail 706 is such that the clamp 712 may be movable up to 2.5-3.5 metres, such as up to around 2.7 metres. The fine adjustments cart 710 may be positioned relative to the guide rail 709 manually or automatically—in the latter implementation using an actuator, such as a motor. As discussed previously if the clamp 712 is moved up, the free wire sections 702, 703 become longer and the natural frequency of the suspended pendulum structure 701 is lowered. Similarly, if the clamp 712 is moved down the free wire sections 702, 703 become shorter and the natural frequency of the suspended pendulum structure 701 is increased. The pendulum structure 701 is suspended from a fixed damper unit structure 705 to which the guide rail 706 is also attached.

Figure 8:
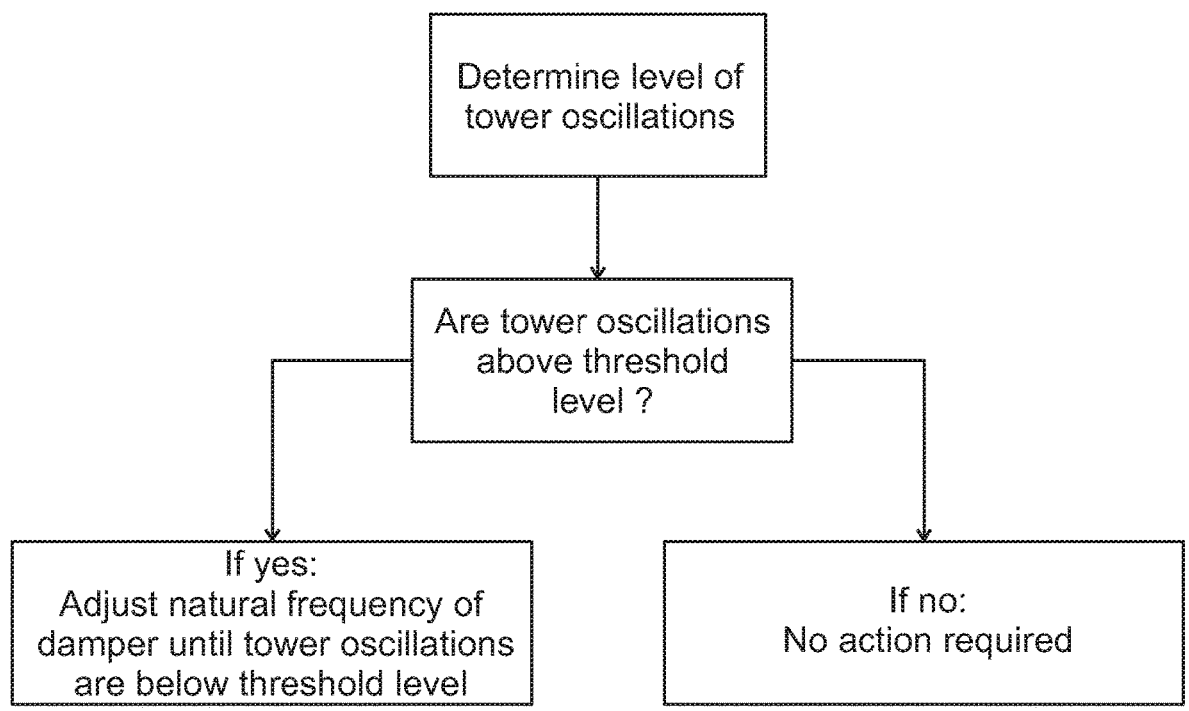
FIG. 8 shows a simple flow-chart of a method for damping tower oscillations.

FIG. 8 shows a very simple flow-chart of the method according to the present invention. Initially the tower oscillations of the wind turbine tower to which the automatically tuned mass damper is attached are determined. If the determined tower oscillations are below an acceptable threshold level no action is required. If, on the other hand, the determined tower oscillations are above an acceptable threshold level the length of the free wire sections of the wires suspending the pendulum structure is adjusted in accordance with the above disclosures of the single and double sledge implementations. The length of the free wire sections of the wires suspending the pendulum structure is adjusted until an acceptable level of tower oscillations has been reached.

The invention claimed is:

1. A damper unit for damping oscillations of a tower structure when secured thereto, the damper unit comprising
   a damper unit structure adapted for attachment to the tower structure,
   a pendulum structure,
   a suspension arrangement for suspending the pendulum structure from the damper unit structure such that the pendulum structure is allowed to displace from a neutral position for the pendulum structure, the suspension arrangement comprising one or more wires for suspending the pendulum structure,
   a sensor adapted for measuring movements of the tower structure, and
   tuning means configured for adjusting the natural frequency of the suspended pendulum structure in response to measured movements of the tower structure.

2. The damper unit according to claim 1, wherein the tuning means comprises processor means for adjusting, in real time, the natural frequency of the suspended pendulum structure in response to measured movements of the tower structure.

3. The damper unit according to claim 2, wherein the damper unit comprises a displacement sensor adapted for measuring displacement of the pendulum structure and wherein the processor means is adapted for optimizing, in real time, the damping effect of the pendulum structure based on the measured displacement.

4. The damper unit according to claim 1, wherein the tuning means comprises a suspension length adjuster for adjusting the natural frequency of the suspended pendulum structure, said adjuster comprising,
- a guide means extending at least partly along the length of said one or more wires,
- a cart attached to and movable along the guide means,
- for each of said one or more wires, a clamp secured to the cart at one end and to the wire at the other end, and
- actuation means for moving the cart along the guide means, the actuation means being operably connected to the processor.

5. The damper unit according to claim 1, wherein the tuning means comprises a suspension length adjuster for adjusting the natural frequency of the suspended pendulum structure, said adjuster comprising,
- a guide means extending at least partly along the length of said one or more wires,
- a cart attached to and movable along the guide means, wherein the cart comprises a locking means for fixing the position of the cart in relation to the guide means, wherein the cart further comprises a fine adjustments guide means extending at least partly along the length of said one or more wires and a fine adjustments cart attached to and movable along the fine adjustments guide means,
- for each of said one or more wires, a clamp secured to the fine adjustments cart at one end and to the wire at the other end,
- an actuation means for moving the fine adjustments cart along the fine adjustments guide means, the actuation means being operably connected to the processor.

6. The damper unit according to claim 1, wherein the damper unit further comprises one or more springs, wherein said one or more springs are connected to the damper unit at one end and to the pendulum structure at the other end.

7. The damper unit according to claim 1, further comprising one or more fastening means adapted for securing the damper unit to a convex surface.

8. The damper unit according to claim 1, further comprising a pendulum damper unit for damping oscillations of the pendulum structure.

9. The damper unit according to claim 8, wherein the pendulum damper unit is selected among friction based dampers, liquid based dampers or Eddy current based dampers.

10. A tower structure having a damper unit according to claim 1 secured thereto, wherein the tower structure forms part of a wind turbine tower or wind turbine tower section.

11. A method for damping oscillations of a tower structure, the method comprising the steps of securing a damper unit to the tower structure, said damper unit comprising
- a damper unit structure adapted for attachment to the tower structure,
- a pendulum structure, and
- a suspension arrangement for suspending the pendulum structure from the damper unit structure such that the pendulum structure is allowed to displace from a neutral position for the pendulum structure, the suspension arrangement comprising one or more wires for suspending the pendulum structure, measuring movements of the tower structure, and adjusting the natural frequency of the suspended pendulum structure in response to measured movements of the tower structure in order to dampen oscillations of a tower structure.

12. The method according to claim 11, wherein the natural frequency of the suspended pendulum structure is adjusted in response to measured movements of the tower structure in real time.

13. The method according to claim 11, wherein the natural frequency of the suspended pendulum structure is optimized with respect to the natural frequency of the tower structure.

14. The method according to claim 11, wherein the natural frequency of the suspended pendulum structure is adjusted by moving, for each of said one or more wires, a movable clamp along a longitudinal direction of the one or more wires, said movable clamp being secured to the damper unit at one end and to the wire at the other end, and wherein the securing of the clamp is configured such that the clamp is movable along a longitudinal direction of the one or more wires.

15. The method according to claim 11, wherein the natural frequency of the suspended pendulum structure is below 2 Hz.

16. The method according to claim 11, wherein the natural frequency of the suspended pendulum structure is below 1.5 Hz.

17. The method according to claim 11, wherein the natural frequency of the suspended pendulum structure is below 1 Hz.

* * * * *